United States Patent [19]

Wolfe et al.

[11] 3,891,609

[45] June 24, 1975

[54] PROCESS TO MINIMIZE YELLOWNESS IN ARTICLES FORMED FROM ACRYLONITRILE-STYRENE COMPOSITIONS

[75] Inventors: Paul Dillon Wolfe, Wilmington, Del.; Ronald Luther Saxton, West Grove, Pa.; Donald Dean Cameron, Wilmington, Del.

[73] Assignee: E. I. du Pont de Nemours & Company, Wilmington, Del.

[22] Filed: May 2, 1974

[21] Appl. No.: 466,308

[52] U.S. Cl. ....... 260/85.5 HC; 260/95; 260/876 R; 260/880
[51] Int. Cl. ............................................ C08f 41/12
[58] Field of Search ......... 260/876 R, 880, 85.5 HC

[56] References Cited
UNITED STATES PATENTS
3,451,538  6/1969  Trementozzi .................. 260/880 X
FOREIGN PATENTS OR APPLICATIONS
919,827   1/1973  Canada

*Primary Examiner*—Murray Tillman
*Assistant Examiner*—Carman J. Seccuro

[57] ABSTRACT

The development of yellowness in an article formed from an acrylonitrile-styrene (or styrene derivative) polymer composition is minimized by 1. coagulation of the polymer in a pH environment of 6.0 to 7.5; and
2. melt processing of the polymer composition (at a temperature of 200°C. to 260°C.) with moisture controlled in the composition either
   a. in an initial range of 0.2 to 1.5 weight percent and a final range of 0.15 to 0.4 weight percent immediately prior to solidification in equipment that provides extraction of volatiles during processing, or
   b. in the range of 0.15 to 0.4 weight percent in equipment that does not provide extraction of volatiles.

The formed article which is essentially free of bubbles is useful where barrier properties to oxygen or carbon dioxide are desirable, e.g., bottles for holding carbonated beverages.

5 Claims, No Drawings

PROCESS TO MINIMIZE YELLOWNESS IN ARTICLES FORMED FROM ACRYLONITRILE-STYRENE COMPOSITIONS

BACKGROUND OF THE INVENTION

The present invention is directed to acrylonitrile polymers which possess high barrier properties and have resistance to the passage of carbon dioxide and/or oxygen.

It is well known in the art that an acrylonitrile polymer is highly desirable for usage wherein a high degree of impermeability to passage of carbon dioxide and/or oxygen is necessary. However, a polymer with an excessive acrylonitrile content ordinarily has an extremely high melt viscosity in melt fabrication. To overcome this problem, various comonomers are employed to reduce melt viscosity and so improve processing characteristics. An example of a high acrylonitrile copolymer is set forth in Trementozzi, U.S. Pat. No. 3,451,538 wherein are disclosed copolymers of acrylonitrile in conjunction with a comonomer of vinylidene aromatic compounds, α-monoolefins of 2 to 8 carbon atoms and methylene glutaryl nitrile. Also disclosed are blends of such copolymers and a preformed rubber grafted with the same comonomers. In Solak et al., U.S. Pat. No. 3,426,102 are disclosed an acrylonitrile containing polymer with an olefinic ester such as ethyl acrylate together with a nitrile rubber. In British Patent Specification Nos. 1,185,305; 1,185,306 and 1,186,361 are set forth a series of teachings of copolymers of acrylonitrile and aromatic olefins.

Additionally, in the prior art is disclosed the formation of acrylonitrile polymers wherein specific processing techniques are employed to minimize undesirable color formation. In Chi et al. Canadian Pat. No. 919,827 is set forth improvement in the color of containers formed from a polymerized nitrile group containing monomer which is required to be an α-substituted monomer having a carbon atom positioned $\alpha$ to the nitrile group and having no hydrogen atoms directly bonded thereto. The preferred monomer is methacrylonitrile with suitable comonomers in formation of the polymer including ethylenically unsaturated aromatic compounds. Color formation is controlled by the presence of 0.06 to 40 percent by weight of water in the manufacture of containers formed from the polymer.

In a later publication involving a common author, as Canadian Pat. No. 919,827 (in a paper presented at the Chicago meeting, American Chemical Society, Journal of Organic Coatings and Plastics Chemistry, August 26-31, 1973 appearing in Preprint, Vol. 33, No. 2, pages 618 to 625) methacrylontrile/styrene copolymer barrier resins are discussed with water contents affecting the discoloration of the polymer. The publication discloses that the water stabilizing action in color prevention is specific to methacrylonitrile-styrene polymers and experiments to stabilize acrylonitrile-styrene copolymers were negative in producing the intended results.

In Chemical Abstracts, Vol. 80, No. 6, Mar. 25, 1974, page 23, 60520F is disclosed improvement in whiteness of an acrylonitrile-butadiene-methyl acrylate polymer in graft copolymerizing onto a rubber component. The whiteness improvement involves treatment of the thermoplastic with aqueous ammonia.

SUMMARY OF THE INVENTION

The purpose of the present invention is to produce an acrylonitrile barrier resin which may be utilized in producing uniform articles with a high degree of impermeability to passage of carbon dioxide and oxygen as well as to produce articles which do not have a high degree of yellowness.

The polymer is formed from acrylonitrile and an additional comonomer selected from styrene, styrene derivatives and mixtures thereof. The polymer may be formed by well known techniques of polymerization. Additionally, to improve toughness of a final article such as produced by molding, a grafted rubber may be employed. Illustrative examples of producing the acrylonitrile-styrene or styrene derivative polymer is in accordance with the techniques disclosed in U.S. Pat. No. 3,451,538 and British Patent Specification No. 1,186,361. A disclosure of a preferred manner of producing the acrylonitrile polymer is set forth in Ser. No. 199,766, filed Nov. 17, 1971 and now U.S. Pat. No. 3,819,762 and Ser. No. 304,014 filed Nov. 6, 1972. In these latter two teachings are disclosed desirable polymer properties obtained by controlling monomer addition to attain uniformity in the polymer chain.

In accordance with the teachings of the art, emulsion polymerization is used to produce the polymer. Thereafter, it is necessary to coagulate the polymer such as by usual methods including heating with steam, addition of salts of multivalents metals or freezing and thawing. Coagulation as employed herein is inclusive of processes of producing filterable particles from the emulsion containing the polymer. In the present invention it is required that the environment in which coagulation takes place be maintained within a pH range of 6.0 to 7.5. More desirably, this pH range will be maintained within the range of 6.5 to 7.0. Thereafter, the polymer may be washed and dried as is conventional. The success of the present invention of preventing color formation is not dependent upon the method of coagulation. Rather, it is necessary to coagulate the polymer in an environment within the critical disclosed pH range. Thereafter, the polymer is formed into a shaped article involving melt processing such as molding or extrusion. In commercial application the polymer is desirably extruded and then cut into pellets for use in a later molding operation, e.g., injection blow molding.

It is necessary for melt processing that an elevated temperature between 200°C. and 260°C. be employed. The development of yellowness is minimized by using the lowest polymer temperature that is practical during melt fabrication. Frequently, temperatures of at least 220°C. are used in order to reduce the viscosity of the polymer melt. However, the temperature of the polymer should not exceed 260°C. as excessive discoloration will result. Aside from color considerations, the optimum temperature is dependent upon the viscosity of the polymer composition, the type of equipment used and the article being made. A desirable range of temperature for many applications is 220° to 240° or 250°C.

During melt processing the moisture content of the polymer composition must be controlled for minimization of yellowness at a specific melt processing temperature. If melt processing equipment is employed that provides for extraction of volatiles during processing, the moisture content of the polymer composition should be within an initial range of 0.2 to 1.5 weight percent. The moisture content of the composition immediately prior to solidification should be within the range of 0.15 to 0.4 weight percent. A more desirable initial moisture content is 0.5 to 1.0 weight percent while a more desirable final moisture content is 0.2 to 0.3 weight percent. With equipment that does not provide for extraction of volatiles during melt processing, the moisture content should be controlled within the range of 0.15 to 0.4 weight percent. A more desirable range is 0.2 to 0.3 weight percent.

To minimize the development of yellowness while the polymer is at melt fabrication temperatures, it is necessary to control the moisture content (in conjunction with the control of pH at the coagulation step). The higher the moisture content during melt fabrication, the lower the yellowness of the product. Nevertheless, the moisture content must not be excessive or the article produced will have surface blemishes and interior bubbles. These faults are esthetically undesirable, and (if severe) will reduce the barrier properties and the toughness of the product.

DETAILED DESCRIPTION

The present process is directed to minimization of undesirable yellow color formation is melt processed articles formed from acrylonitrile-styrene copolymers or acrylonitrile-styrene derivative copolymers in a composition which may have a rubber introduced for toughening. More specifically, the present process is directed to formation of polymers containing A. 65 to 100 percent by weight of a polymer consisting essentially of 67 to 85 percent by weight acrylonitrile polymerized units and 33 to 15 percent by weight polymerized units derived from styrene or a styrene derivative; and B. 0 to 35 percent by weight grafted rubber, the grafted rubber consisting essentially of 30 to 50 percent by weight of a graft copolymer consisting of 61 to 85 percent by weight acrylonitrile polymerized units and 39 percent to 15 percent by weight polymerized units of styrene, a styrene derivative or combinations thereof, and 50 to 70 percent by weight rubber. It is most desirable that the final composition have a carbon dioxide permeability less than 0.1 barrer. Desirably where high impermeability to carbon dioxide is necessary (e.g., bottles for carbonated beverages) the value will be less than 0.045 barrer.

Although the process is directed to copolymers of acrylonitrile-styrene or styrene derivatives, a preferred polymer composition may be prepared in accordance with the teachings set forth in either U.S. Ser. No. 199,766, filed Nov. 17, 1971, and now U.S. Pat. No. 3,819,762, or U.S. Ser. No. 304,014, filed Nov. 6, 1972. In accordance with these two preferred teachings, the copolymer composition will contain components (A) and (B) with the limitations above except for a lower limit of 67 percent of acrylonitrile for component (A).

In the present definition a styrene derivative includes 4-methyl styrene; 4-(t-butyl) styrene; 3-methyl styrene; 2,4-dimethyl styrene; 2,6-dimethyl styrene; and 2,4-diisopropyl styrene. The combination of styrene with the styrene derivatives may be utilized. In addition, α-methyl styrene can be used in combination with one of the above styrenes and preferably a styrene which is not substituted.

In a preferred composition a grafted rubber is highly desirable for toughening. Representatives of a type of rubber which is useful in the composition are those of conjugated dienes. The conjugated diene polymerized units of these rubbers normally comprise 50 to 100 percent by weight of the rubber. Preferred conjugated dienes are butadiene and isoprene.

In accordance with the disclosures in Ser. No. 199,766, filed Nov. 17, 1971 and now U.S. Pat. No. 3,819,762 and U.S. Ser. No. 304,014, filed Nov. 6, 1972, preferred compositions of components (A) alone or component (A) and (B) are comprised of acrylonitrile/styrene or styrene derivative polymers in which each molecule is composed of substantially the same acrylonitrile/styrene or styrene derivative content as the overall acrylonitrile/styrene or styrene derivative polymer by virtue of the synthesis conditions whereby the ratio of the acrylonitrile and styrene or styrene derivative monomers are maintained in a substantially constant and predetermined ratio in the polymerization reactor. For example, where acrylonitrile and styrene are involved, the acrylonitrile/styrene compositions by weight of each molecule of (A) is substantially the same as the acrylonitrile/styrene overall composition of (A).

As is more fully described in these disclosures, the acrylonitrile and styrene or styrene derivatives is polymerized in the presence of a suitable amount of emulsifier and a free radical initiator whereby the styrene or styrene derivative alone or in combination with acrylonitrile is added to the reaction medium throughout the polymerization process. The amount of addition into the reactor is controlled continuously maintaining a ratio of the styrene or styrene derivative to acrylonitrile in the reaction medium within 25 percent of the ratio required to be maintained to produce a polymer with an average composition selected from 67 to 85 percent by weight acrylonitrile and 33 to 15 percent by weight of the styrene or styrene derivative. As set forth in these earlier teachings, it is desirable to recover a polymer having (a) an inherent viscosity of 0.3 to 1.0 deciliter per gram as measured on a 0.5 g/deciliter solution of the polymer in gamma-butyrolactone at 35° and (b) a melt viscosity at $10^4$ to $10^6$ poises at 220°C. The measurements of inherent viscosity and melt viscosity are made in accordance with teachings set forth in the earlier patent applications. Inherent viscosity is measured on a 0.5 g/deciliter solution of the polymer in gamma-butyrolactone at 35°C. Inherent viscosity is defined as $\ln \eta \, r/C$ where $\eta r$ is the relative viscosity (flow time of solution/flow time of solvent) and C is the concentration of polymer in g/dl. The inherent viscosity may be determined on a Ubbelohde viscometer.

As stated, it is most desirable that a melt viscosity of the polymer of component (A) be within the range of $10^4$ to $10^6$ poises at 220°C. Melt viscosity as employed herein is measured with a cone and plate rheometer at a stress of $7.9 \times 10^3$ dynes/cm$^2$. The apparatus used for determining melt viscosity is described in "Stress Relaxation After Steady Shearing: Applications in Empirical Representation" by E. Menefee in the Journal of Applied Polymer Science, Vol. 8, pp 849 to 861, 1964.

As previously stated it is desirable that the carbon dioxide permeability of the final composition be less than 0.1 barrer and more desirably less than 0.045 barrer in order for the composition to have the desired barrier qualities against passage of carbon dioxide and/or oxygen. Most desirably, the carbon dioxide permeability of component (A) of the composition should normally be less than 0.02 barrer. The rubber in component (B) of the composition is less reresistant to permeation of oxygen or carbon dioxide than the polymer of component (A) or the graft copolymer of component (B). Therefore, the permeability of the composition as a whole, if grafted rubber is utilized, is somewhat more than the permeability of component (A).

Carbon dioxide permeability measurements may be made following the procedure of ASTM D-1434 (Method M). Permeability is expressed in barrers which have the units $$\frac{10^{-10}(\text{cc. carbon dioxide at standard temp. and pressure})(\text{cm})}{(\text{cm}^2)\ (\text{second})\ (\text{cm mercury})}.$$

Another highly desirable property of a preferred polymer composition is a high degree of melt stability. This property is determined by measuring the melt viscosity repeatedly for a period of 1 hour. The curve of log $\eta_0$ versus time can be characterized by two quantities $S_1$ and $S_2$. These are the values of d(Log $\eta_0$)/dt in the intervals 0–20 minutes and 20–60 minutes respectively. For particularly stable compositions a single value suffices for the 60-minute period. From these quantities can be calculated the value of $T_2$, the time in minutes for the melt viscosity to double ($T_2 = 41.6/S_1$). If the value of $T_2$ is much greater than 20 minutes, an average value of $S_1$ and $S_2$ can be used for $S_1$. $T_2$ is therefore a measure of melt stability. A highly desirable level of melt stability is characterized by a value of $T_2$ of not less than 10 minutes.

Turning to the polymerization process, as previously discussed, the acrylonitrile/styrene or styrene derivative matrix as well as the grafted rubber portion of the polymer may be prepared in accordance with well-known techniques in the art. An emulsion process is employed wherein the emulsifier is desirably used in conjunction with a free radical initiator. Conventional emulsifiers include sodium and potassium alkyl benzene sulfonates, and sodium and potassium lauryl sulfates, while free radical initiators include persulfates and peroxides (e.g., see Canadian Pat. No. 919,827).

After formation of the polymer latex by emulsion techniques, it is necessary to coagulate the polymer. In the present disclosure, coagulation is defined as the process resulting in filterable particles of the acrylonitrile-styrene and/or styrene derivative containing polymer from the emulsion polymerization step. Well-known techniques of coagulation may be employed by heating with steam, addition of salts of multivalent metals, or freezing and thawing. Illustratively, salts of multivalent metals include use of acetates, chlorides and sulfates of either magnesium or aluminum.

In the coagulation procedure, it is understood that component (A) and component (B) defined above may be coagulated separately or in conjunction with one another.

It is critical to the success of the present disclosure that the pH be controlled during the coagulation procedure to obtain a pH between 6.0 to 7.5. Most desirably, the pH will be maintained within the range of 6.5 to 7.0.

After coagulation it is conventional to wash and dry the coagulated polymer. After these steps the coagulated polymer is formed into a definite shape by a melt processing operation. In the present context melt processing includes any technique involving heat and mechanical means to shape the polymer composition. Illustrative of melt processes are extrusion, blow molding, injection molding, injection blow molding, etc. Additionally, melt processing is inclusive of use of techniques wherein the extraction of volatiles is provided such as in vented extrusion or molding machines.

In melt processing involving a technique that provides for extraction of volatiles during processing, whether in the manufacture of an intermediate article (e.g., an extruded pellet) or directly in the manufacture of an ultimate article (e.g., container for holding a carbonated beverage), the initial moisture content of the polymer composition is controlled within the range of 0.2 to 1.5 weight percent. A more desirable range is of the order of 0.5 to 1.0 weight percent. Due to designed release of extractables during processing such as with equipment allowing venting, the moisture content of the molten polymer composition will be lowered in the melt processing step. It is necessary that the final moisture content of the molten polymer composition be in the range of 0.15 to 0.4 weight percent at least immediately prior to the time of solidification.

By contrast, in a melt processing step that does not provide for extraction of volatiles, the moisture content of the composition will remain substantially the same throughout the melt processing step. In such a process, the moisture content of the composition in melt processing is controlled in the range of 0.15 to 0.4 weight percent. A more desirable range will be 0.2 to 0.3 weight percent.

Use of a polymer composition with too low a moisture content in melt processing will result in added yellowness introduced to the shaped article regardless of the final moisture content and regardless of the pH at which coagulation takes place. Excessive moisture contents are likewise undesirable since it is either necessary to remove an unduly large amount of moisture in the forming operation or the final article will have blemishes and bubbles. With bubbles present permeability is raised in an uncontrollable manner. For example, a highly desirable use for a barrier resin is in beverage bottles which contain carbonated liquids. With bubbles in the polymer, the degree of impermeability to passage of carbon dioxide through the polymer must suffer, as well as the ability of the container to contain pressure and to resist breakage.

Melt processing will be at an elevated temperature of 200°C. to 260°C. A minimum temperature of 220°C. will be employed for many applications since a given composition will have a lower viscosity than the temperature of 200°C. Generally, temperatures above 260°C. are undesirable due to degradation of the polymer. A desirable maximum operating temperature for achieving the necessary melt flow is of the order of 240°C. or 250°C.

Additives may be added to the composition such as for example stabilizers including antioxidants as well as pigments and dyes. These additives are conventional to the art and may be incorporated by well-known methods such as mixing after coagulation and drying but prior to melt processing. Alternatively, blending of the additives may take place at a later time such as by dry blending after shaping of the coagulated polymer into pellets followed by reshaping by extrusion. For the final usage of the fabricated article, the exact makeup of the polymer composition will be dependent upon the necessary properties desired, e.g., toughness or permeability. Also, commercial processing techniques encompass a variety of machines for shaping the polymer. Therefore, optimum conditions will be expected to differ according to the exact polymer composition employed as well as the machine utilized. However, following the teachings of the present disclosure on a given acrylonitrile/styrene, and/or styrene derivative polymer, alone or in combination with a rubber toughener, a reduction in yellowness will be realized by operation at the disclosed pH range in relationship to the coagulation step together with control of the moisture content into and out of a shaping operation under pressure at elevated temperature.

To further illustrate aspects of the present invention, the following Examples are provided:

EXAMPLE 1

The procedure of Examples I and IX of U.S. Ser. No. 304,014 filed Nov. 6, 1972 was followed in polymerizing acrylonitrile and styrene (Part A) as well as forming an acrylonitrile/styrene graft onto a rubber substrate (Part B). With a scaleup factor of at least 7 times in Parts A and B (modified slightly), the procedure of Ser. No. 304,014 was employed which procedure is set forth below. Part C sets forth the coagulation procedure.

Part A - Preparation of acrylonitrile-styrene polymer Latex Emulsion

An initial charge in an autoclave consisted of 46.5 pounds of water, 18.2 pounds of acrylonitrile, 131 ml. styrene, 76.3 grams of lauryl mercaptan, 900 cc. of a ten percent solution in water of (p-nonyl phenyl)-omega-hydroxypoly(oxyethylene)[mixture of dihydrogen and monohydrogen phosphate esters with an acid number at pH 5.2 of 62-72-General Aniline & Film Co.] Before addition, the 10 percent solution was brought to a pH of 7 by adding ammonium hydroxide. The charge was stirred at 150 rpms and heated to 60°C. by passing warm water through the jacket of the autoclave. Prior to heating oxygen was removed from the autoclave by bubbling a slow stream of nitrogen through the batch. A solution of 2.9 grams of potassium persulfate in 72 cc of water was then added. After an induction period of 58 seconds, the start of the reaction was signalled by a rise in temperature of about 0.2°C. At this time, addition of 101.8 grams of lauryl mercaptan in 4.4 pounds of styrene was begun. Addition of this styrene solution was continued for the balance of the run at rates shown below designed to hold the ratio of styrene monomer to acrylonitrile monomer in the autoclave at a constant value.

| Time, Minutes | Addition, Rates of Styrene Solution, ml/min | Time, Minutes | Addition, Rates of Styrene Solution, ml/min |
|---|---|---|---|
| 0–15 | 10 | 96–108 | 10.2 |
| 15–40 | 10.8 | 108–137 | 8.8 |
| 40–60 | 11.3 | 137–141 | 8.0 |
| 60–76 | 12.1 | 141–144 | 7.6 |
| 76–80 | 12.6 | 144–150 | 7.0 |
| 80–83 | 11.5 | 150–170 | 6.0 |

-Continued

| Time, Minutes | Addition, Rates of Styrene Solution, ml/min | Time, Minutes | Addition, Rates of Styrene Solution, ml/min |
|---|---|---|---|
| 83–90 | 11.2 | 170–183 | 5.2 |
| 90–96 | 10.8 | 183–200 | 4.4 |

After 60 minutes of reaction time the addition of an additional 1070 cc. portion of the 10 percent solution of (pnonyl phenyl)-omega-hydroxypoly(oxyethylene)[mixture of dihydrogen and monohydrogen phosphate esters with an acid number at pH 5.2 of 62-72 - General Aniline & Film Co.] described above was commenced. It was added over an 80-minute period. The total reaction time was 200 minutes.

The batch temperature ranged from 60 to 60.8°C. over the course of the run and was controlled by adjusting the temperature of the water fed to the jacket of the autoclave.

After 200 minutes the reactor was rapidly cooled down and the polymer emulsion was discharged. The final conversion of acrylonitrile was about 77.6 percent.

Part B - Preparation of Grafted Latex Emulsion

A 4-liter flanged, jacketed, glass reactor was equipped with a mechanical stirrer, thermocouple, reflux condenser and sampling port. Constant reaction temperature was maintained by adjusting the temperature of the water circulated through the reactor jacket. The reactor was thoroughly purged with nitrogen before use. The following ingredients were charged to the reactor:

| | |
|---|---|
| 15.6% styrene/84.4% butadiene (by weight) latex | 844.2 g. (390 g. of rubber on a solid basis) |
| Acrylonitrile | 47 grams |
| Styrene | 3.02 grams |
| Water (distilled) | 1432.8 ml. |

The rubber latex used contained residual styrene monomer, which was therefore carried into the initial charge. The 3.02 g. of styrene shown above came from the rubber latex and was determined by gas chromatography analysis.

The latex diluted with the water was neutralized with diluted sulfuric acid (one concentrated sulfuric acid: 10 water) to a pH of 6.5. The diluted latex and acrylonitrile were mixed and air removed by alternate evacuation and blanketing with nitrogen 3 times. The reactants were heated to 60°C. and 55 mls. solution of 6 grams of potassium persulfate in 100 mls. of water, were added. Following the addition of the persulfate initiator, a solution consisting of 76 percent acrylonitrile and 24 percent styrene by weight was fed continuously into the reactor. *(See note below). Feed rate was 0.85 ml. per minute for the first 60 minutes and 1.18 ml/minute between 60 and 232 minutes. The reaction was continued until a total of 253 ml. of monomer solution was fed. The reactor contents were cooled and 11.9 g. of a 33 percent dispersion of 2,2-methylene-bis-(6-t-butyl-4-methyl)phenol was added. Material balance calculation based on gas chromatography analysis of unreacted monomers showed that the product mixture contained 23.3 percent solid of which 64.6 percent was the rubber used.

* In the procedure employed following this Example 1B, a solution of 74 weight percent and 26 weight percent was actually employed.

Part C - Coagulation of Acrylonitrile-styrene Polymer Latex Emulsion and Grafted Latex Emulsion Coagulation was carried out in 150 gallon tanks fitted with an agitator, a baffle, and arranged for injection of steam into the liquid content of the vessel to provide heat as needed. For each coagulation a solution of 10 lb. of magnesium sulfate heptahydrate in 50 gallons of water was used. This solution was maintained at 75°C. and stirred vigorously while about 50 gallons of mixed polymer latex prepared in accordance with Part A and Part B was added during half an hour. The emulsions of acrylonitrile/styrene copolymer emulsion prepared in Part A and the grafted latex prepared in Part B were employed in a ratio to give a 10 percent by weight rubber substrate based on the total dry weight of the polymer blend. The slurry was held at 75°C. for another half hour, then stirring and heating were stopped. The mixed polymer settled enough to allow about one-third of the liquid to be drained off. This was replaced with water at room temperature which was mixed with the slurry to dilute and cool it. The polymer mixture was separated from the slurry using a centrifuge, then was dried in a rotary vacuum dryer to give a powder.

Unless otherwise specified, the powder represents the starting material in later examples.

EXAMPLE 2

A continuous polymer latex coagulation system was charged with an aqueous solution of 1.7 g/l, $Al_2(SO_4)_3 \cdot 18H_2O$. The coagulator apparatus consisted of two stirred, 1800 cc. stainless steel kettles connected in series such that the effluent from the first kettle was transferred to the second by means of an overflow pipe. The two kettles were heated until the contents of the first and second kettles reached temperatures of 70°C. and 90°C. respectively. In all Examples involving coagulation, the emulsions of A and B were mixed to give a 10 percent by weight (dry basis) rubber substrate based on the total powder which was formed. Aluminum sulfate solution of the concentration specified above, and the mixture of polymer latices of Examples 1A and 1B were then fed continuously into the first kettle as separate feed streams at rates of 117 cc/min. and 107 cc/min. respectively. While the coagulant solution and latex were continuously fed, the slurry pH in the second kettle was controlled at a given level by continuous addition of 1N NaOH solution from a burette. The pH was measured by means of a pH electrode immersed in the second kettle, and all measurements were made at the operating temperature of 90°C. The following pH values were used: 3.0, 4.0, 5.0, 6.0, 6.5, 7.5, 8.5, and 10.0. At each pH level, a slurry sample was taken at the exit of the second kettle after an operating time of 25 minutes. The slurry was vacuum filtered at 50°C., and washed at room temperature with a volume of distilled water equal to the volume of slurry collected. The wet filter cake was then dried under vacuum at 100°C.

The dried powder at similar moisture content listed below was compression molded into 3 inch discs, 0.080 inch thick, at 230°C. and 1415 psi. Yellowness Index was measured on these discs using a Hunter D2502 Spectrometer in accordance to ASTM D-1925-70.

The results are tabulated below.

| pH at 90°C. | Yellowness Index (Y.I.) | Moisture % $H_2O$ |
|---|---|---|
| 3.0 | 58 | 0.14 |
| 4.0 | 43 | 0.15 |
| 5.0 | 30 | 0.13 |
| 6.0 | 22 | 0.16 |
| 6.5 | 21 | 0.19 |
| 7.5 | 24 | 0.22 |
| 8.5 | 40 | 0.16 |
| 10.0 | 97 | 0.24 |

EXAMPLE 3

Using the procedure described in Example 2, a mixed polymer emulsion of Examples 1A and B was continuously coagulated using an aqueous solution of $MgSO_4 \cdot 7H_2O$, at a concentration of 20 g/l. The pH levels used were 6.0, 6.5, 7.0, 7.5, 8.5 and 9.5. Slurry samples taken under steady state conditions were filtered and washed as described in Example 2 and dried in the same conditions resulting in similar moisture contents. Compression molded sample discs at similar moisture contents were analyzed for yellowness (ASTM D-1925-70). The results are summarized below:

| pH at 90°C. | Yellowness Index (Y.I.) | Moisture % $H_2O$ |
|---|---|---|
| 6.0 | 29 | 0.16 |
| 6.5 | 25 | 0.17 |
| 7.0 | 24 | 0.18 |
| 7.5 | 21 | 0.20 |
| 8.5 | 32 | 0.20 |
| 9.5 | 56 | 0.18 |

EXAMPLE 4

Continuous coagulation of a mixed polymer emulsion prepared in accordance to Examples 1A and B was carried out in two 4,000 ml. stainless steel beakers in series. Each beaker was heated with a hot plate, agitated, fitted with a single baffle to improve mixing, and arranged with an overflow at the 2,000 ml level; so that the contents of the first beaker are transferred to the second. The first kettle was charged with 2,000 ml of distilled water, 20.0 grams of anhydrous $MgSO_4$ and heated to 55°-65°C. The second beaker was similarly charged and heated to 85°-95°C. Mixed polymer emulsion and $MgSO_4$ solution, 10.0 gram/1,000 ml., were pumped into the first beaker at approximately 50 ml/min.

After running for about an hour, an 800 ml sample of slurry was taken from the overflow of the second beaker. The pH was 5.1 while this sample, designated Sample A, was taken.

The feed was then switched to pre-neutralized emulsion, prepared essentially as described in Example infra and 0.2 N NaOH was pumped to the coagulator. The flow rate of the NaOH was varied to maintain the pH of the overflow from the second beaker at approximately 6.8. An 800 ml slurry sample was collected, and designated Sample B.

The solids were recovered by filtration. Each sample was washed on the filter with four 500 ml. portions of distilled water. The samples were dried in a vacuum oven to 0.11 percent water content and molded in 0.08 inch thick discs at 230°C. The A sample gave a disc considerably more yellow than one pressed from sample B. Comparison with some discs whose yellowness had been measured with a Hunter color meter (ASTM D-1925-79) indicated that B had a yellowness index of about 20, while the yellowness index for A was in the upper thirties. This indicated considerable practical benefit from pH adjustment during coagulation even though the final moisture content was unduly low.

EXAMPLE 5

A continuous coagulation of mixed polymer emulsion prepared in accordance with the procedure of Examples 1A and 1B was carried out using $MgSO_4$ solution.

A control run of coagulation with no attempt to control the pH gave a pH of 5.3–5.4 and after an hour of running sample A was taken. A pH of 6.25 was obtained by pumping 0.2N NaOH to the system at 0.8 ml/min. After an hour of running at these conditions, sample B was taken. The pumping rate of the NaOH solution was raised to 1.05–1.15 ml/min. and after 1½ hours at these conditions sample C was taken at a pH of 6.8–6.9. The NaOH rate was then raised to between 1.3 and 1.4 ml/min. and after running for two more hours sample D was taken at a pH of 7.3–7.4. All pH measurements were made on slurry samples taken at the exit from the second stainless beaker.

The coagulant was isolated by filtration, washed on the filter, dried to about 0.05 percent water in a vacuum oven, and pressed into discs at 230°C. Yellowness of samples was then measured (ASTM D-1925-70).

| SAMPLE | COAGULATION pH | YELLOWNESS INDEX |
|---|---|---|
| A | 5.3–5.4 | 66.0 |
| B | 6.3 | 28.9 |
| C | 6.8–6.9 | 27.2 |
| D | 7.3–7.4 | 25.5 |

The results indicated considerable improvement from pH adjustment during coagulation even though the moisture content of the discs was unduly low.

EXAMPLE 6

Coagulation to allow separation of the polymer from the mixed latex of Examples 1A and 1B was carried out in a 4 liter kettle provided with a jacket to supply heat, with an agitator, and with a single baffle to improve mixing. A solution of 9 g. of magnesium sulfate trihydrate in 900 ml. water was stirred and warmed to 65°C. A 300 ml. portion of mixed latex prepared in accordance with Examples 1A and 1B was poured slowly into the hot stirred coagulant solution. When addition was complete, the temperature was increased to 75°C., then 700 ml. of water was added and the mixture was filtered to recover the polymer. The cake was washed on the filter with 3 liters of water. The washed cake was transferred to a pan and dried overnight in a vacuum oven at 85° to 90°C., 22 inches vacuum, and with a slow nitrogen purge through the oven.

In Sample A the procedure above was followed and pH was measured at several stages. The mixed latex had a pH of 6.35, the coagulant solution had a pH of 7.0. The slurry after coagulation had a pH of 5.1 and after dilution had a pH of 5.5.

In Sample B the mixed latex had a pH of 6.35. Addition of 2 ml. of 0.096 N sodium hydroxide solution was added which increased the latex pH to 6.8. The magnesium sulfate solution had a pH of 6.5 and was adjusted to a pH of 6.9 by addition of one drop of the dilute sodium hydroxide solution. After coagulation the slurry pH was 5.5, and after dilution it was 5.7. The addition of 7.5 ml. of the dilute base brought the slurry pH to 6.8 just prior to filtration.

Samples A and B were compression molded at 230°C. to provide discs 7.5 cm. in diameter and 0.2 cm. thick for comparison of yellowness. The disc molded from the product of case B was much less yellow than the disc of case A product.

EXAMPLE 7

A mixed latex emulsion prepared in accordance to Examples 1A and 1B was split and part A was processed in accordance with the procedure of Example 1C. For Part B, the same procedure was employed except for a pH adjustment of the mixed latex from 6.6 to 6.9 by addition of 60 ml. of 2N sodium hydroxide solution. After coagulation and dilution of the slurry pH was 5.8 Addition of 225 ml of 2N sodium hydroxide solution increased the pH to 6.95. Polymer separation and drying to powder then proceeded as for Example 1C.

A second pair of samples was made from mixed latex prepared in accordance to Examples 1A and 1B. Once again Part A was processed in accordance to Example 1C with no base added to adjust pH of the slurry. In part B 70 ml. of 2N sodium hydroxide was added to bring the latex pH from 6.5 up to 6.8. After coagulation and the half hour cook period the pH of the slurry was observed to be 5.6. Addition of 240 ml. of 2N sodium hydroxide increased the pH from 5.6 to 6.85.

The dry powders were extruded to produce molding pellets using a Werner and Pfleiderer ZSK53 twin screw extruder with melt temperature 191° to 192 C., 38 rpm screw speed, 39 to 50 lb/hour production rate, and 25 inches vacuum on a single extraction port. The water contents of the powders fed to the extruder and the pellets produced were as shown.

| Sample | % Water in: Fluff | Extruded Pellets |
|---|---|---|
| 1st set A | 0.19 | 0.02 |
| B | 0.16 | 0.02 |
| 2nd set A | 0.17 | 0.04 |
| B | 0.19 | 0.05 |

The extruded pellets of Part A were more yellow than those from Part B of each lot of resin. Compression molding were made at 230°C. from the pellets with water contents as obtained from the extruder. In each pair the Part B moldings were obviously less yellow than the molding made from Part A samples.

Polymers of the second set were used for more extensive study of the yellowness. Portions of the products were adjusted to various water contents, discs were compression molded at 230°C. and yellowness was measured following ASTM D-1925-70. Two sets of discs were made and tested with the results shown below.

|  | 1<br>No. pH Adjustment | | 2<br>pH Adjustment | |
|---|---|---|---|---|
|  | % Water | Yellowness | % Water | Yellowness |
| Set I | 0.001 | 87 | 0.007 | 33 |
|  | 0.043 | 72 | 0.057 | 38 |
|  | 0.21 | 21 | 0.20 | 18 |
|  | 0.42 | 13 | 0.42 | 13 |
|  | 0.005 | 95 | 0.004 | 33 |
|  | 0.04 | 72 | 0.05 | 29 |
| Set II | 0.12 | 36 | 0.14 | 28 |
|  | 0.19 | 26 | 0.20 | 23 |
|  | 0.45 | 15 | 0.44 | 15 |

EXAMPLE 8

A polymer powder was prepared by following the procedure of Examples 1A, 1B, and 1C, and converted to pellets by extrusion. The moisture content of separate portions of the pellets was adjusted to various levels in the range 0.02 to 0.92 percent. Moisture was removed when necessary, by drying in a vacuum oven under a slow nitrogen purge at 85°C., or was added by moisturizing. The latter procedure consisted of exposing the polymer to a humid atmosphere over a saturated water solution of sodium chloride in a desiccator at room temperature. After moisturizing for the desired length of time, a bottle containing the polymer was removed and sealed and placed in an oven at 85°C. for 3 or more hours while water equilibrated through the thickness of the powder.

Following either the drying or moisturizing step, the moisture contents of the powders were determined using a Du Pont 321A moisture analyzer.

The powders each having a different moisture content were compression molded into 0.080 inch thick discs at 230°C. and again at 245°C. The mold was a positive-pressure mold which is placed by hand between the heated platens of a manually-operated hydraulic press. The mold consisted of a steel ring, 3 inches inside diameter, and two steel plugs 3 inches in diameter.

Yellowness index was measured on compression molded discs according to ASTM D-1925-70. Results are presented below:

EFFECT OF MOISTURE CONTENT DURING COMPRESSION MOLDING FOR 5 MINUTES AT 230°C. AND AT 245°C. ON YELLOWNESS OF 0.080" THICK SPECIMENS

| Moisture<br>Content % | 230°C.<br>Yellowness Index | 245°C.<br>Yellowness Index |
|---|---|---|
| 0.02 | 78.2 | — |
| 0.07 | 46.7 | 75.6 |
| 0.20 | 26.8 | 31.3 |
| 0.92 | 15.5 | 13.9 |

EXAMPLE 9

A. A series of 5.0 lb. samples of powder of a single lot prepared in accordance with Example 1A, 1B and 1C was weighed. Based upon a measured initial water content, an aliquot of powder was taken from each and blended with a measured amount of water in an Osterizer blender. Each aliquot was then blended with the bulk of the parent sample, and the moisture content of the blend determined by means of a Du Pont Moisture Analyzer. The samples were then extruded, in turn, in 50-mm, intermeshing, counter-rotating vented twin-screw extruder. The extraction port was left open but no vacuum was applied. The screw speed was 25 rpm, the output was about 11–13 lb/hour, and the melt temperature was 232°C. The extruded strands were cooled in water, air-stripped of water droplets and cut into pellets.

The pellets were compression molded into 80-mil thick plaques at 230°C., and the Yellowness Index of each plaque was measured on following ASTM procedure D-1925-70.

|  | Water Content<br>of composition<br>before extrusion<br>(%) | Water Content of<br>Pellets (%) | Yellowness Index |
|---|---|---|---|
| A | .51 | .22 | 51.2 |
| B | .39 | .17 | 66.2 |
| C | .66 | .27 | 43.9 |
| D | .84 | .27 | 39.7 |
| E | 1.78 | .26 | 42.2 |

B. The procedure of Part A was repeated except additionally an additive was present as for example an emulsifier or antioxidant. These additives and results obtained are as follows:

|  | Additive | Water Content of<br>Composition be-<br>fore extrusion (%) | Water<br>Content<br>of Pel-<br>let(%) | Yellow-<br>ness<br>Index |
|---|---|---|---|---|
| F | 4.5 g Santonox R | .2 | .059 | 86.4 |
| G | 4.5 Sodium Borate | .4 | .12 | 70.4 |
| H | 11.3 g Gafac RS-610 | 2.04 | .26 | 44.6 |
| I | 6.0 g Gafac RS-610 | 1.29 | .26 | 41.9 |

EXAMPLE 10

The moisture content of a sample of dried powder prepared in accordance to Example 1A, 1B, 1C was measured on a Du Pont 321A solids moisture analyzer and found to be 0.26 percent. The sample was converted to pellets by extrusion in a single-screw extruder with a 2 inch diameter screw, operated at 25 rpm and with a temperature profile that resulted in a melt temperature of 214°C. A vacuum of 28 inches was applied to the extraction section of the extruder, about midway between the melting section and the die. The moisture content was reduced to 0.054 percent and the yellowness, after compression molding at 230°C. was 43. Three more samples differing in initial moisture content were extruded under the same conditions. For all samples, the screw speed was 25 rpm; the vacuum was 28.0–28.5 inches; the melt temperature range was 211°–214°C. and the production rate was 11.4–13.4 lb/hour. The following data were obtained:

| Moisture Content of Powder, before Extrusion, % | % Moisture After Extrusion | Yellowness Index Sample 0.080" Thick Molded from Pellets |
|---|---|---|
| A  0.26 | .054 | 49.2 |
| B  0.29 | .083 | 42.7 |
| C  0.26 | .061 | 48.5 |
| D  0.15 | .052 | 53.5 |

EXAMPLE 11

The moisture content of powder prepared in accordance to Examples 1A, 1B and 1C was measured on a Du Pont 321A solids moisture analyzer and found to be 0.44 percent. The moisture content of each of two portions of this powder was raised to 0.70 percent by the addition of distilled water involving the following procedure: A portion of the 8-pound sample was removed from its container and put in a high-speed food blender. A calculated volume of distilled water, 9.4 ml. was added to the blender, followed by some additional polymer from the same sample. The blender was closed and run until the sample was well-mixed. All the powder, now containing additional moisture was returned to the 8-lb. container, which was sealed and shaken until uniform. This sample was then allowed to stand five days during which time moisture migration throughout the batch improved uniformity.

Two duplicate samples were extruded using a screw speed of 50 rpm and a temperature profile on the extruder that resulted in a melt temperature of 239°C., measured by hand probe in the die outlet. The first of the duplicate samples was extruded with no vacuum applied to the extraction port, which is about midway between the melting region and the die of the extruder. The second sample of the same powder at the same moisture content, was fed into the extruder immediately after the first with no change in conditions except that the vacuum valve was opened, to apply a vacuum of 30 inches Hg to the extraction zone of the extruder. Application of vacuum reduced the moisture content of the extruded pellets from 0.29 percent (extruded with no vacuum) to 0.08 percent (extruded with vacuum). To evaluate the effect of extrusion conditions on yellowness extruded pellets of the two samples were adjusted to a moisture content of 0.15. These samples were compression molded to give specimens 0.080 inch thick using a press temperature of 230°C. The following yellowness data were obtained:

| Moisture before extrusion | 0.70% | 0.70% |
|---|---|---|
| Extrusion extraction vacuum | None | 30" |
| Moisture after extrusion | 0.29% | 0.08% |
| Moisture adjusted before molding to | 0.15 | 0.14% |
| Yellowness of molded chips | 39. | 55. |

Although the invention has been described by way of specific embodiments, it is not intended to be limited thereto. As will be apparent to those skilled in the art, numerous embodiments can be made without departing from the spirit of the invention or the scope of the following claims.

What is claimed is:

1. In a process for forming a shaped article made from a composition containing a polymer formed from acrylonitrile and styrene, a styrene derivative or combinations thereof, said composition comprising
    A. 65 to 100 percent by weight of a polymer consisting essentially of 67 to 85 percent by weight acrylonitrile polymerized units and 33 to 15 percent by weight polymerized units derived from styrene, a styrene derivative, or combinations thereof wherein said styrene derivative is selected from 4-methyl styrene; 4-(t-butyl) styrene; 3-methyl styrene; 2,4-dimethyl styrene; 2,6-dimethyl styrene; 2,4-diisopropyl styrene and α-methyl styrene; and
    B. 0 to 35 percent by weight grafted rubber, the grafted rubber consisting essentially of 30 to 50 percent by weight of a graft polymer consisting of 61 to 85 percent by weight acrylonitrile polymerized units and 39 to 15 percent by weight polymerized units of styrene, said styrene derivative or combinations thereof, and 50 to 70 percent by weight rubber;

wherein the shaped article is formed by
    1. emulsion polymerizing in the presence of a free radical generator to form said composition;
    2. coagulating said composition;
    3. melt processing to form a shaped article at a temperature of 200°C. to 260°C.; wherein said improvement comprises
        I. coagulating said polymer composition in an environment maintained at a pH of 6.0 to 7.5; and
        II. melt processing said polymer composition at:
            a. an initial moisture content of 0.2 to 1.5 weight percent and releasing volatiles to yield a shaped article containing a moisture content of 0.15 to 0.4 weight percent immediately prior to solidification or
            b. a moisture content of 0.15 to 0.4 weight percent without a substantial release of volatiles;
whereby yellowness is minimized in an essentially bubble free article.

2. The process of claim 1 wherein said pH is 6.5 to 7.0.

3. The process of claim 1 wherein said initial moisture content in step II(a) is 0.5 to 1.0 weight percent.

4. The process of claim 3 wherein said moisture content immediately prior to solidification is 0.2 to 0.3 weight percent.

5. The process of claim 1 wherein said moisture content in step II(b) is 0.2 to 0.3 weight percent.

* * * * *